(12) United States Patent
Barabash et al.

(10) Patent No.: US 6,434,122 B2
(45) Date of Patent: Aug. 13, 2002

(54) FILTERING METHOD TO ALLOW FDD AND TDD OPERATION IN PCS TRANSRECEIVERS

(75) Inventors: Darrell W. Barabash, Grapevine; Russell A. Morris, Keller, both of TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/780,948

(22) Filed: Feb. 9, 2001

Related U.S. Application Data

(63) Continuation of application No. 09/075,415, filed on May 8, 1998, now Pat. No. 6,212,172.

(51) Int. Cl.$^7$ ............................................... H04B 7/00
(52) U.S. Cl. .......................... 370/277; 370/330; 455/76
(58) Field of Search ................................ 370/277, 280, 370/330–335, 489, 328, 422, 470–476, 342–350, 442; 455/447–450, 560–562, 20, 76; 375/346–349, 296–298, 106

(56) References Cited

U.S. PATENT DOCUMENTS

| | | | |
|---|---|---|---|
| 5,475,677 A | 12/1995 | Arnold | ......................... 370/280 |
| 5,809,395 A | 9/1998 | Piercy et al. | ................ 370/489 |
| 5,933,421 A | 8/1999 | Alamouti et al. | ............ 370/330 |
| 6,118,984 A | 9/2000 | Yu-Hong | ....................... 455/76 |
| 6,212,172 B1 * | 4/2001 | Barabash et al. | ............ 370/277 |

* cited by examiner

*Primary Examiner*—Kwang Bin Yao
*Assistant Examiner*—Prenell Jones
(74) *Attorney, Agent, or Firm*—Blakely, Sokoloff, Taylor & Zafman LLP

(57) ABSTRACT

A transreceiver allows efficient operation in a full or half-duplex TDD or FDD system. The preferred transreceiver includes a common set of filters used for both FDD (Frequency Division Duplex) and TDD (Time Division Duplex) operation in a given range of frequencies thereby reducing circuitry count and implementation costs. Thus, the transreceiver of the present invention can operate in FDD operation or TDD operation.

15 Claims, 1 Drawing Sheet

FILTERING METHOD TO ALLOW FDD AND TDD OPERATION IN PCS TRANSRECEIVERS

This application is a continuation of U.S. application Ser. No. 09/075,415 filed on May 8, 1998, now U.S. Pat. No. 6,212,172.

FIELD OF THE INVENTION

The field of the invention pertains to wireless communication transreceivers including, more particularly, transreceivers capable of FDD and TDD operation.

DESCRIPTION OF RELATED ART

One method of providing duplex communication is through use of FDD (Frequency Division Duplex) protocols in which frequency allocations in the PCS band is split into a forward sub-band and a reverse sub-band. This split can accommodate FDD where transmission is limited to one of the sub-bands. However, this split presents a problem to coexisting TDD (Time Division Duplex) systems which transmit and receive on the same frequency and can use either of the frequency sub-bands for transmission.

Shown in FIG. 1 is a known implementation of a TDMA-FDD system, such as PCS-1900 or IS-136 with a switch placed between the radio and the antenna. The switch, placed before the forward and reverse channel filters, selectively routes the RF signal path either to the receiver or from the transmitter in response to the mode of the transreceiver (either transmit or receive). The receiver subsystem will typically employ a bandpass filter tuned to the forward channel, and the transmitter subsystem will typically employ a filter tuned to the reverse channel. As a result of this switch placement, only the forward channel path or only the reverse channel path may be selected. This configuration precludes transmission and reception in both the forward channel frequency band or the reverse channel frequency band, thereby limiting the available frequency bands for a TDD system. Other known implementations remove the switch entirely to allow simultaneous transmit and receive (e.g., IS-54 and IS-19) but are still limited to different frequencies.

While a transreceiver operable in FDD or TDD could employ duplexers, or dual filters, for FDD operation plus an additional filter and switch for TDD operation, since either the TDD or FDD mode uses its own set of filters, one set of components will be under utilized rendering the system cost inefficient.

SUMMARY OF THE INVENTION

The present invention comprises a transreceiver architecture that allows a common set of filters to be used for either FDD (Frequency Division Duplex) or TDD (Time Division Duplex) operation in a given range of frequencies, thereby reducing circuitry count and implementation costs. Accordingly, the present invention allows operation in a full or half-duplex TDD or FDD system.

In a preferred embodiment of the invention, switches are incorporated after the forward and reverse channel filters to create three paths controlled by predetermined logic. This configuration permits use of both the forward and reverse channel filters for a TDD system and combines the forward and reverse channel filters to create a filter that can pass both frequency sub-bands. These single device frequency duplexers are often commercially available, thereby allowing for ease in implementation and cost reduction.

Some frequency allocation plans, such as those in the USA, often have a frequency band between the transmit and receive regions. In the USA, this frequency band can be referred to as the "unlicensed frequency band" and can be used for TDD only. An alternative preferred embodiment comprises an additional filter to allow exploitation of multiple frequency bands for transmission and reception.

DETAILED DESCRIPTION OF THE PREFERRED EMBODIMENT

Figure 1:
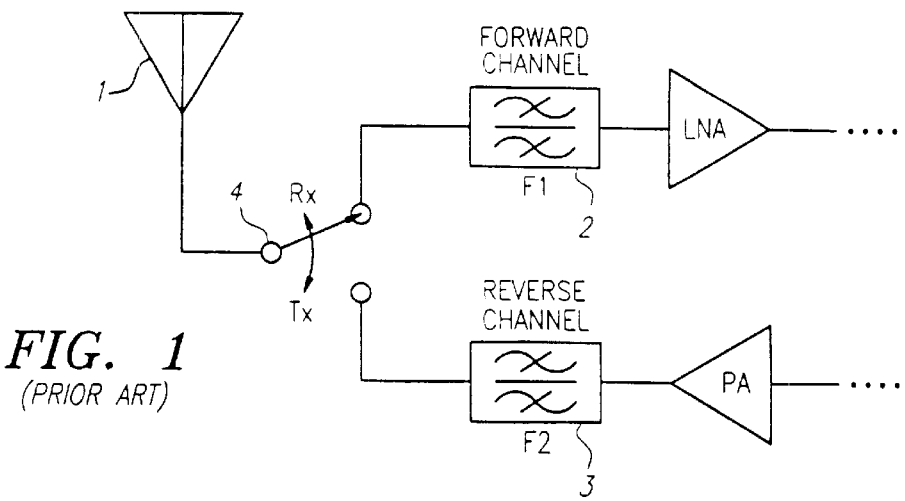
FIG. 1 is a known TDMA-FDD transreceiver architecture.

Referring to FIG. 1, the known TDMA-FDD capable architecture depicts an antenna 1 electrically coupled to forward channel filters 2 and reverse channel filters 3, each tuned to a different frequency $F_1$ and $F_2$ respectively. Thus, in the known FDD transreceiver the switch 4 will be placed in the Rx position to connect the antenna to channel filter 2 to receive signals and will be placed in the Tx position to connect the antenna 1 to the reverse channel filter 3 to transmit signals. While more than one antenna and more than one set of forward and reverse channels will usually be employed, only one set is described herein for simplicity and efficiency. Alternatively, the antenna 1 can be split into a receive and transmit antenna, each individually connected to a respective filter (not shown).

Figure 2:
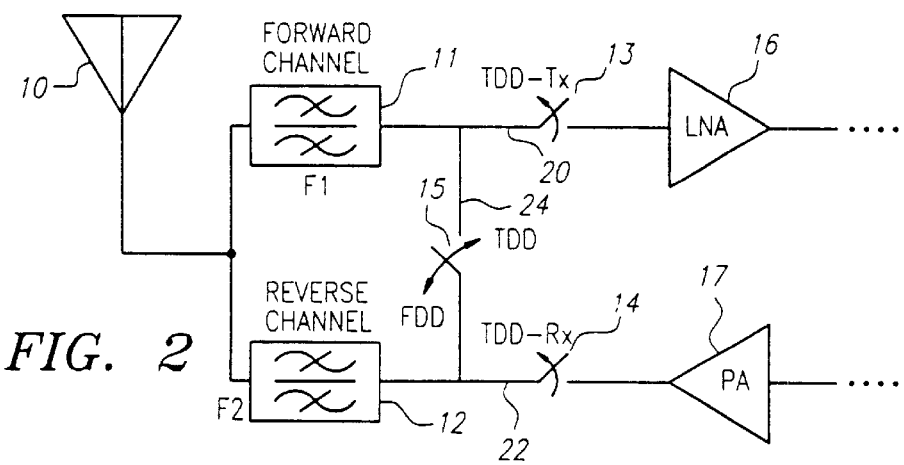
FIG. 2 is a schematic diagram of a transreceiver of the present invention.

As the preferred dual mode FDD/TDD transreceiver, depicted in FIG. 2, the forward channel filter 11 and the reverse channel filter 12 are tuned to different frequencies $F_1$ and $F_2$ respectively, both connected to the antenna 10 without the typical Tx/Rx switch 4 interposed between them. Instead, a TDD-Tx switch 13 is interposed in a receive path 20 between the forward channel filter 11 and the low-noise amplifier 16. Also, a TDD/Rx switch 14 is interposed in the transmit path 22 between the reverse channel filter 12 and the power amplifier 17. Additionally, an FDD/TDD switch 1S is interposed in TDD path 24 between the receiver and transmit paths 20 and 22 respectively. When the dual mode FDD/TDD transreceiver is operating in the full or half duplex FDD mode, as dictated by the Boolean equations for the switch states, the TDD/Tx switch 13 will be closed, the FDD-TDD switch 15 will be open and the TDD/Rx switch 14 will be closed. The result is that the diplexer function created by the forward channel filter 11 and the reverse channel filter 12 passes the portion of the signal in the $F_1$ frequency ranges through the TDD/Tx switch 13 to the low-noise amplifier 16 and into the receive channel. In the transmit mode, the output of the transmitter channel is passed through the TDD/Rx switch 14 to the reverse channel filter 12 and is transmitted by the antenna 10. This functionality represents classical FDD operation.

Although the filters and switches may be described having input and output ends, signals are being propagated in both directions. Thus, although input and output ends may be described, such labels are for references and orientation purposes.

If it is desired to operate the dual mode TDD/FDD transreceiver in the TDD mode, the FDD-TDD switch 15 will be closed. In the TDD receive mode, the TDD-Tx switch 13 will be closed and the TDD-Rx switch 14 will be open. In the TDD transmit mode, the TDD-Rx switch 14 will be closed and the TDD-Tx switch 13 will be open. Thus, while transmitting in the TDD-Tx mode, the TDD-Rx switch 14 is closed and the output of the transreceiver is applied to both the reverse channel filter 12 and also the forward channel filter 11 through the FDD-TDD switch 15. Thus signals in both frequency ranges $F_1$ and $F_2$ will be passed to the antenna 10 with minimal loss. When receiving, the portion of the received signal in the forward frequency band $F_1$ passes through the forward channel filter 11 and the portion of the received signal in the reverse frequency band $F_2$ passes through the receive channel through the LNA 16.

In the preferred embodiment, the forward channel and reverse channel filters have a total electrical length between their filter outputs that is either very small (e.g. less than $\pi/20$ radians) or equal to $n^*\pi$ radians where 'n' is as small an integer as possible. The reason for this is that filters are generally reflective outside their passband and, in the case of typical radio filters, behave as open circuits. An open circuit translated through a transmission line whose electrical length is a multiple of $\pi$ radians will still appear as an open circuit. Thus, a signal that is in the forward passband will pass through the forward channel filters 11 and the reverse channel filters 12 and will appear as an open circuit. Since the transmission line will appear as an open circuit, the signal is effectively rejected by the circuit, i.e. will have no influence on the forward channel filters 11. Should a filter behave as a short circuit, an additional $\pi/2$ may be added to transform the short circuit to an open circuit.

Figure 3:
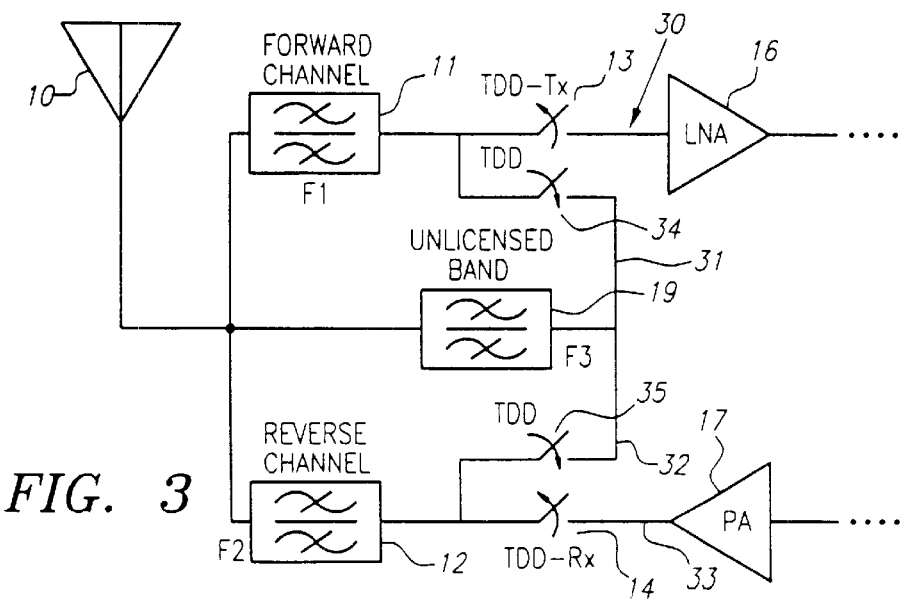
FIG. 3 is a schematic diagram of a second transreceiver of the present invention.

An alternative preferred arrangement is disclosed in FIG. 3. The architecture operates in a similar manner as that shown in FIG. 2 except that an additional bandpass filter 19 permits the system to operate in the TDD mode over an additional frequency band F3, such as the "unlicensed frequency band".

As depicted in FIG. 3, the forward channel filter 11, the reverse channel filter 12, and the unlicensed band filter 19 are tuned to different frequencies $F_1$, $F_2$, and $F_3$ respectively. Each filter can be connected to the antenna 10 without a Tx/Rx switch 4 interposed between them. Instead, a TDD-Tx switch 13 is interposed in a receive path 30 between the forward channel filter 11 and the low-noise amplifier 16. Also, a TDD/Rx switch 14 is interposed in the transmit path 33 between the reverse channel filter 12 and the power amplifier 17. Additionally, TDD switch 34 is interposed in TDD path 31 between the forward channel filter 11 and the unlicensed band filter 19. Finally, TDD switch 35 is interposed in TDD path 32 between the reverse channel filter 12 and the unlicensed band filter 19.

When the dual mode FDD/TDD transreceiver is operating in the FDD mode, as dictated by the Boolean equations for the switch states, the TDD/Tx switch 13 will be closed, both TDD switch 34 and TDD switch 35 will be open and the TDD/Rx switch 14 will be closed. The result is that the diplexer function created by the forward channel filter 11 and the reverse channel filter 12 passes the portion of the signal in the $F_1$ frequency ranges through the TDD/Tx switch 13 to the low-noise amplifier 16 and into the receive channel. In the transmit mode, the output of the transmitter channel is passed through the TDD/Rx switch 14 to the reverse channel filter 12 and is transmitted by the antenna 10. This functionality represents classical FDD operation.

If it is desired to operate the dual mode TDD/FDD transreceiver in the TDD mode, unlicensed filter 19 can be included with forward channel filter 11 and reverse channel filter 12 to accommodate the "unlicensed" frequency band.

In the TDD receive mode, the TDD-Tx switch 13 will be closed and the TDD-Rx switch 14 will be open. With TDD switch 34 closed and TDD switch 35 open, path 31 to the unlicensed band filter 19 is completed. Thus, with the TDD-Tx switch 13 closed, the receive portion of the transreceiver is applied to both the forward channel filter 11 and also the unlicensed filter 19. As a result, signals in both frequency ranges $F_1$ and $F_3$ will be received from the antenna 10. When TDD switch 35 is closed, path 32 is completed and the frequency range $F_2$ can pass through the reverse channel 12 from the antenna 10. When receiving, the portion of the received signal in the forward frequency band $F_1$ passes through the forward channel filter 11 and the portion of the received signal in the reverse frequency band $F_2$ passes through the receive channel through the LNA 16 and the frequency band $F_3$ passes through the unlicensed channel 19. Thus, with TDD switch 34 closed and TDD switch 35 closed, signals in frequency ranges $F_1$, $F_2$ and $F_3$ will be received from the antenna 10.

In the TDD transmit mode, the TDD-Rx switch 14 will be closed and the TDD-Tx switch 13 will be open. With TDD switch 35 closed and TDD switch 34 open, path 32 to the unlicensed band filter 19 is completed. Thus, the output of the transreceiver is applied to both the reverse channel filter 12 and also the unlicensed filter 19 through the TDD switch 35. As a result, signals in both frequency ranges $F_2$ and $F_3$ will be passed to the antenna 10 with minimal loss. When TDD switch 34 is closed, path 31 is completed and the frequency range $F_1$ can pass through the forward channel 11 to the antenna 10. Thus, with TDD switch 34 and TDD switch 35 closed, signals in frequency ranges $F_1$, $F_2$ and $F_3$ will be passed to the antenna 10 with minimal loss. In the preferred embodiment, the forward channel and reverse channel filters have a total electrical length between their filter outputs that is either very small (e.g. less than $\pi/20$ radians) or equal to $n^*\pi$ radians where 'n' is as small an integer as possible.

We claim:

1. A method for implementing a dual mode FDD/TDD transreceiver, the transreceiver comprising an antenna, a forward channel filter electrically coupled to said antenna, a reverse channel filter electrically coupled to said antenna, and an FDD/TDD switch electrically connectable to said filters, the method comprising:

closing said FDD/TDD switch;

passing a communication signal through said forward channel filter and said reverse channel filter; and determining whether to open or close a TDD-Tx switch electrically coupled to said forward channel filter, and whether to open or close a TDD-Rx switch, the TDD-RX switch electrically coupled to said reverse channel filter.

2. The method of claim 1, further comprising:

opening said FDD/TDD switch;

closing said TDD-Tx switch; and closing said TDD-Rx switch;

wherein said opening and closing of said switches causes said FDD/TDD transreceiver to operate in a FDD mode.

3. The method of claim 2, further comprising:

closing said FDD/TDD switch;

closing said TDD-Tx switch; and opening said TDD-Rx switch;

wherein said opening and closing of said switches causes said FDD/TDD transreceiver to operate in a TDD receive mode.

4. The method of claim 2, further comprising:
closing said FDD/TDD switch;
opening said TDD-Tx switch; and
closing said TDD-Rx switch;
wherein said opening and closing of said switches causes said FDD/TDD transreceiver to operate in a TDD transmit mode.

5. The method of claim 1, further comprising:
closing said TDD-Tx switch; and
opening said TDD-Rx switch;
wherein said opening and closing of said switches causes said FDD/TDD transreceiver to operate in a TDD receive mode.

6. The method of claim 1, further comprising:
opening said TDD-Tx switch; and
closing said TDD-Rx switch;
wherein said opening and closing of said switches causes said FDD/TDD transreceiver to operate in a TDD transmit mode.

7. A method for implementing a dual mode FDD/TDD transreceiver, the transreceiver comprising an antenna, a forward channel filter electrically coupled to said antenna and electrically connectable to a low noise amplifier through a TDD-Tx switch, a reverse channel filter electrically coupled to said antenna and electrically connectable to a power amplifier, an unlicensed band filter electrically coupled to said antenna, and further electrically connectable to said forward channel filter through a first TDD switch and said reverse channel filter through a second TDD switch, the method comprising:

closing at least one of the TDD switches;
passing a communication signal through said unlicensed filter; and
determining whether to open or close a TDD-Tx switch electrically coupled to said forward channel filter, and whether to open or close a TDD-Rx switch, the TDD-Rx switch electrically coupled to said reverse channel filter.

8. The method of claim 7, further comprising:
opening the second TDD switch;
opening the TDD-Rx switch; and
closing the TDD-Tx switch;
wherein the step of closing at least one of the TDD switches includes closing the first TDD switch, and
wherein said opening and said closing of said switches causes said FDD/TDD transreceiver to operate in a TDD receive mode.

9. The method of claim 8, further comprising closing the second TDD switch.

10. The method of claim 9, further comprising:
opening the first TDD switch; and
opening the second TDD switch;
wherein opening said TDD switches causes the FDD/TDD transreceiver to operate in an FDD mode.

11. The method of claim 8, further comprising opening the second TDD switch to cause the FDD/TDD transreceiver to operate in an FDD mode.

12. The method of claim 7, further comprising:
opening the first TDD switch;
opening the TDD-Tx switch; and
closing the TDD-Rx switch;
wherein the step of closing at least one of the TDD switches includes closing the second TDD switch, and
wherein said opening and said closing of said switches causes said FDD/TDD transreceiver to operate in a TDD transmit mode.

13. The method of claim 12, further comprising closing the first TDD switch.

14. The method of claim 13, further comprising:
opening the first TDD switch; and
opening the second TDD switch;
wherein opening said TDD switches causes the FDD/TDD transreceiver to operate in an FDD mode.

15. The method of claim 12, further comprising opening the second TDD switch to cause the FDD/TDD transreceiver to operate in an FDD mode.

* * * * *